United States Patent

[11] 3,578,839

[72] Inventors Grant C. Riggle
Bethesda;
James P. White, Bradbury, Md.
[21] Appl. No. 770,344
[22] Filed Oct. 24, 1968
[45] Patented May 18, 1971
[73] Assignee The United States of America as represented by the Secretary of Health, Education and Welfare

[54] AUTOMATED DEVICE FOR PROTECTING LENS SYSTEMS
8 Claims, 5 Drawing Figs.

[52] U.S. Cl. .................................................. 350/61, 95/11
[51] Int. Cl. .................................................. G02b
[50] Field of Search .......................................... 350/61; 95/11

[56] References Cited
UNITED STATES PATENTS
3,370,519 2/1968 Garcia et al. ................. 95/11
FOREIGN PATENTS
155,889 3/1954 Australia ...................... 350/61

Primary Examiner—Paul R. Gilliam
Attorney—Alvin Browdy

ABSTRACT: The automated device for protecting lens systems in lasers includes a motor driven protective film which advances across the laser lens after each light flash. A mechanical sensor operative in response to film position selectively connects the film driving motor to an electro-optical control system which energizes the motor in response to light flashes.

PATENTED MAY 18 1971
3,578,839
SHEET 1 OF 2
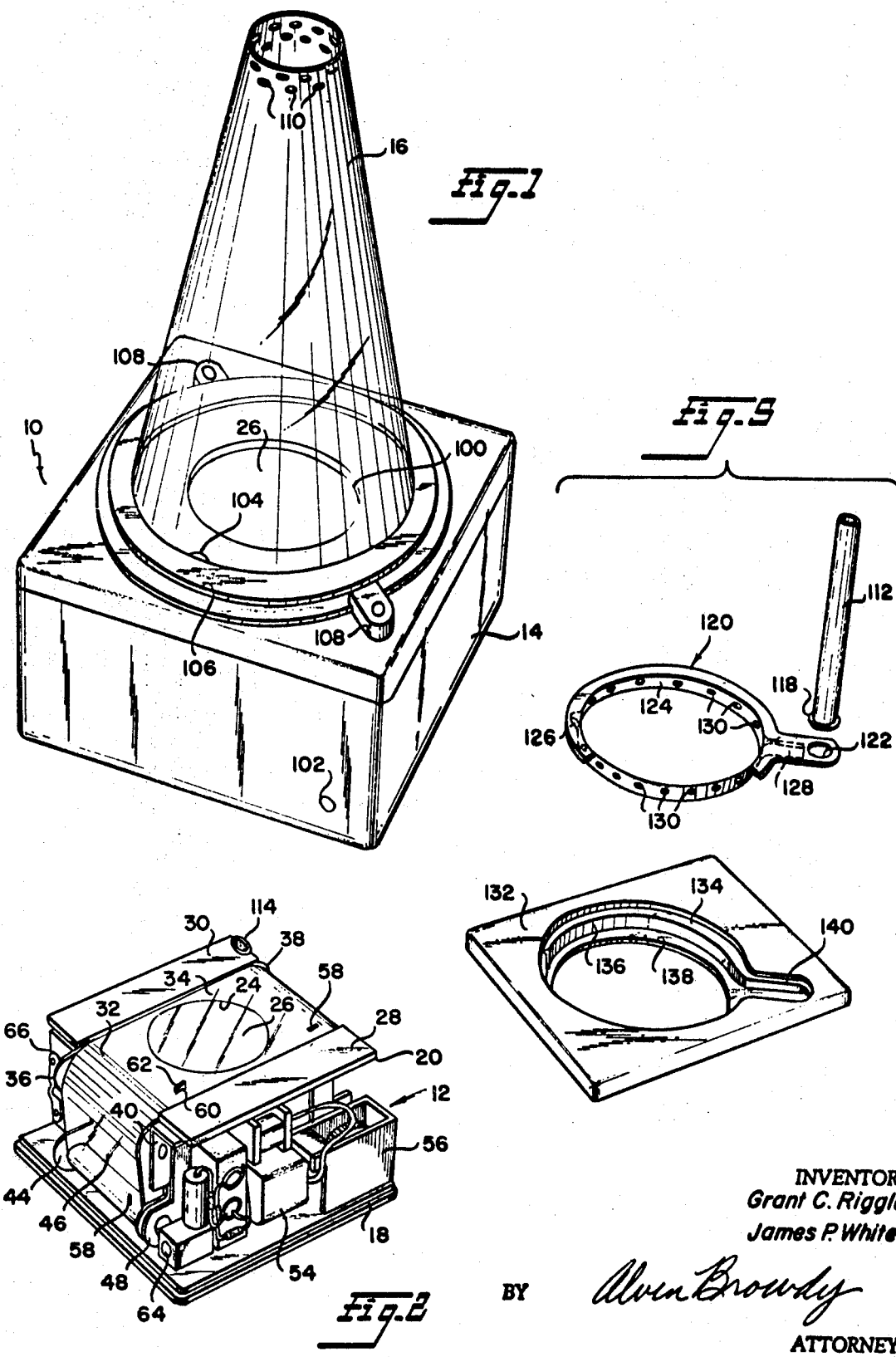
INVENTORS
Grant C. Riggle
James P. White
BY Alvin Browdy
ATTORNEY

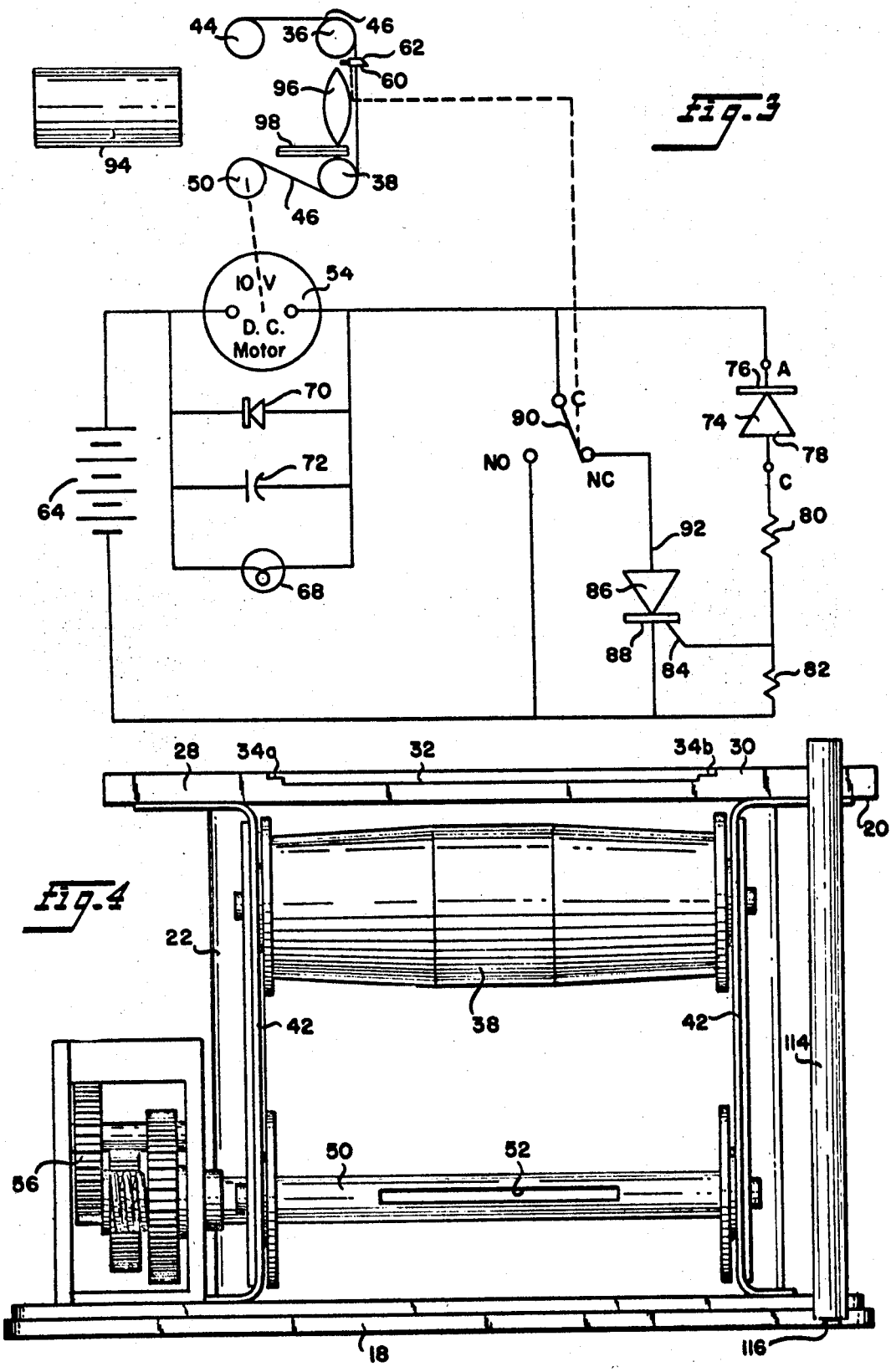

3,578,839

AUTOMATED DEVICE FOR PROTECTING LENS SYSTEMS

This invention relates to optical laser systems generally and more particularly to a novel automated device for protecting a laser lens from particulate material which is projected along the path of the laser beam.

The intense light directed upon liquids, metals, in vivo and in vitro tissue, and similar material from a laser source results in the explosion, rupture or vaporization of material and the generation of a "plume" of particulate matter. This matter is projected along the path of the laser beam and is ultimately deposited on the lens which is used to shape and/or converge the light energy. This deposit not only renders a portion of the lens surface opaque to subsequent light transmission, by also absorbs light energy to cause localized destruction of the lens surface. With an unprotected lens surface, the rate of lens surface degradation due to this particulate deposit is so great that the useful life expectancy of a lens is quite limited.

In medical laser applications, the effects of the particulate matter resulting from the laser beam can cause serious consequences. For example, in the case of laser light directed to carcinous in vivo tissue, it has been established that the disseminated airborne particulate material may not be necrosed, and if deposited on tissue indigenous toward further support, may in turn cause further spread of the cancerous tissue. Therefore, not only should the laser lens system be protected from the airborne particulate material, but such material must be removed from the environment of surgically exposed tissue to prevent deposited material from falling into the opened wound.

It is a primary object of the present invention to provide a novel automated device for protecting laser lens systems which operates effectively to collect particulate material projected along the path of the laser beam.

Another object of the present invention is to provide a novel automated device for protecting laser lens systems which collects and removes particulate material projected along the path of the laser beam from the vicinity of the lens system.

A further object of the present invention is to provide a novel automated device for protecting laser lens systems which reduces the spread of particulate matter associated with the laser burst.

Another object of the present invention is to provide a novel automated device for protecting laser lens systems which includes an electro-optical system for advancing a film across a lens opening in response to laser bursts.

A still further object of the present invention is to provide a novel automated device for protecting laser lens systems which includes interchangeable protective components which are sterilizable for hospital use.

These and other objects of the present invention will become readily apparent upon a consideration of the following specification in light of the accompanying drawing in which:

FIG. 1 is a perspective view of the automated device for protecting lens systems in lasers of the present invention;

FIG. 2 is a perspective view of the device of FIG. 1 with the casing removed;

FIG. 3 is a schematic diagram of the electro-optical control system for the automated device for protecting lens systems in lasers of the present invention;

FIG. 4 is an end elevational view of the support assembly of the present invention; and FIG. 5 is a perspective view of sections of a vacuum evacuating system for the present invention.

In accordance with the present invention, the lens system of a laser is protected from particulate material projected along the path of the laser beam by an intervening film strip formed from material which has a very low energy loss to laser wave lengths. A clear acetate film approximately 0.003 inches thick has been found to be particularly suited for this purpose, Prior to use, the film strip must be processed to remove foreign matter from the surface thereof. Film from a commercial roll cut to the desired size is moved along a guide surface and a plurality of spaced slots are punched in the film. Subsequently, the slotted film is passed between two opposed air jets, and high pressure, cleaned air jets impinge on both sides of the film to remove any foreign particles which have been electrostatically attracted to the charged surfaces thereof. The cleaned film is then spooled for use.

Referring now to the drawings, the automated device for protecting lens systems in lasers indicated generally at 10 includes a support assembly 12, a cover 14 for the support assembly, and a glass or transparent plastic cone 16.

The support assembly 12 includes a baseplate 18 which is spaced from a film guide plate 20 by a central cylinder block 22. The central cylinder block extends between a circular central opening 24 in the film guide plate and a similar central opening (not shown aligned therewith in the baseplate to form a cylindrical bore 26 extending centrally through the support assembly.

The film guide plate 20 is formed by two, spaced, elongated guide shoulders 28 and 30 which are joined by a web portion 32 containing the central opening 24. The guide shoulders extend longitudinally, in parallel relationship along opposite sides of the web portion and project outwardly beyond opposite ends of the web portion. Additionally, the guide shoulders extend above the top surface 34 of the web portion so that the web portion forms a recessed film guide.

If contact between the top surface 34 and a film guided thereby occurs over a large area of the film surface, surface scratching will result. Therefore, the top surface of the web portion is recessed to form two parallel film support shoulders 34a and 34b adjacent the guide shoulders 28 and 30. Only the film support shoulders contact the film and the center of the film is not contacted by the top surface 34.

The electro-optical control components and the film guiding mechanism for the automated lens protecting device 10 are mounted on the support assembly 12 adjacent the central cylinder block 22 and between the baseplate 18 and the film guide plate 20. The film guiding mechanism includes two film idler spools 36 and 38 which are mounted to extend across either end of the web 32. The idler spools are journaled for free rotation in spaced pairs of mounts 40 and 42; the mounts 40 being formed by mounting blocks secured to the underside of the film guide plate 20, while the mounts 42 constitute spaced mounting arms secured between the baseplate 18 and the film guide plate 20. The idler spools are positioned so that a line tangent to the top of each spool and parallel to the web 32 will extend across the top guide surface 34.

Positioned on the support assembly 10 beneath the idler spool 36 is a supply spool 44 containing a supply of protective film 46. As previously indicated, this film may constitute an acetate strip or other film suitable for the transmission of a laser beam.

The supply spool 44 is mounted for rotation in a pair of spaced leaf spring arms 48 secured to the mounting blocks 40 and extending downwardly to a position adjacent the baseplate 18. These leaf spring arms may be flexed outwardly to facilitate insertion and removal of the film supply spool. Also, the spring arms engage the ends of the supply spool to prevent free rotation of the spool, and a driving force must be applied to the film before the supply spool rotates in the spring arms.

The film 46 is driven from the supply spool 44 by a driving spool 50 which is mounted beneath the idler spool 38. The driving spool is provided with a slot 52, or other suitable means to receive the free end of the film, and is mounted for rotation in the mounting arms 42. An electric motor 54 secured to the baseplate 18 is connected to drive the driving spool through a reduction gear system 56 so that film from the supply spool 44 is drawn across the idler spool 36, the web 32, and the idler spool 38 to be wound on the driving spool.

It should be noted that the film 46 is dimensioned to extend completely across the circular opening 24 and moves in close contact with the film support shoulders 34a and 34b between the guide shoulders 28 and 30 so that the circular opening is effectively closed at all times.

As previously noted, the film 46 is provided with a plurality of longitudinally spaced slots 58 which are oriented to pass over a sensor finger 60 projecting upwardly from the guide surface 34. The sensor finger is mounted in an opening in the guide plate 20 and is suitably biased to project into a slot 58 when the slot passes above the sensor finger. However, when the film is driven by the driving spool 50, the edge of the slot 58 contacts an inclined surface 62 on the sensor finger and cams the sensor finger into the guide plate 20. The film will hold the sensor finger in the guide plate until a subsequent slot 58 moves into position above the sensor finger.

The operation of the motor 54 is controlled by an electro-optical control system responsive to the laser beam and the sensor finger 60. The motor and control system are provided with power from a power source 64 which may constitute batteries mounted in battery clips 66 secured to the support assembly 12. The motor is shunted by an indicator light 68 and parallel diode 70 and capacitor 72; the parallel circuit operating to energize the indicator light when the motor is operating.

A photodiode detector 74 includes an anode 76 connected to the motor 54 and a cathode 78 connected to a resistor 80. The motor, photodiode, resistor 80, and a resistor 82 are connected in series across the terminals of the power source 64. The gate electrode 84 of a controlled rectifier (SCR) 86 is electrically connected between the resistors 80 and 82 and the anode 88 of the SCR is connected to the power source. A microswitch 90 suitably linked for operation by the sensor finger 62 selectively connects the motor to either the cathode 92 of the SCR or directly across the power source 64.

The photodiode 74 provides a gating signal to the gate electrode 84 of the SCR when a light beam from the laser source 94 is projected through the lens 96 and the film 46. A light transmitting unit 98, formed by a flexible fiber optical bundle or other suitable light transmitting means is mounted in an aperture in the web 32 and operates to transmit the light flash which passes through the film to the photodiode detector.

The cover 14 is designed to fit over the film guide plate 20 with the edges of the cover abutting the baseplate 18, and the cover is secured to the support assembly 12 by bolts or other suitable attaching units (not shown). With the cover in place, a central aperture 100 in the top thereof is positioned over the cylindrical bore 26, while an aperture 102 is provided to permit observation of the indicator light 68. A third aperture 104 is provided in the cover above the light transmitting unit 98.

The glass or transparent plastic cone 16 constitutes an open ended cone, the large end of which is adapted to fit around the central aperture 100. The cone is removably secured to the cover 14 by means of a metal retaining ring 106 which engages a peripheral flange formed at the large end of the cone. Suitable fasteners 108 may be employed to secure the retaining ring to the cover.

The cone 16 is adapted for connection to a vacuum system which operates to reduce the spread of particulate material associated with the laser burst. The small end of the cone is provided with a plurality of openings 110 which permit air to be drawn into the cone by a vacuum at the large end thereof. This vacuum is applied through a tube 112 which is held in a guide tube 114 secured between the baseplate 18 and film guide plate 20. The upper end of the guide tube extends through the film guide plate and the lower end thereof is aligned with an aperture 116 in the baseplate. A vacuum source, not shown, may be suitably connected to the aperture 116.

The upper end of the tube 112 is provided with a flange 118 which mates with the surface of a manifold ring 120 adjacent an aperture 122. The manifold ring is provided with a circular flange 124 and divider flanges 126 and 128 which extend laterally therefrom. The circular flange is provided with a plurality of spaced apertures 130.

The manifold ring 120 is adapted to fit flush with the top surface of a top plate 132 which has been milled to receive the manifold ring. The top plate includes a seat 134 for the manifold ring and a circular cutaway section 136 having a bottom wall 138 which, with the circular flange 124 of the manifold ring forms a vacuum passage. A laterally extending cutaway section 140 is formed in the top plate and communicates with the circular cutaway section 136.

The manifold ring 120 seats in the seat 134 and the circular flange 124 abuts the bottom wall 136 to form a vacuum passage between the circular flange and the body of the top plate. The divider flange 128 extends into the cutaway section 140, and with the divider flange 126, operates to divide the vacuum passage into two sections.

The circular flange 124 and bottom wall 136 define the aperture 100 in the cover 14 when the top plate is secured to the remainder of the cover as illustrated in FIG. 1. It will be apparent that a vacuum source applied to the aperture 116 in the baseplate 18 will cause air to pass in through the openings 110 in the cone 16, through the cone and through the apertures 130 into the passage between the circular flange 124 and the body of the top plate, through the aperture 122 and tube 112 and out through the aperture 116. Thus material entrained in this air stream may be effectively removed from the cone 14 and the area of the laser lens.

In the operation of the lens protecting device 10, the supply spool 44 containing a roll of cleaned film is snapped between the leaf spring arms 48 and the film is passed across the idler roller 36, the guide surface 34, and the idler roller 38 to the driving spool 50. The end of the film is secured in the slot 52 and the sensor finger 60 is manually depressed so that the microswitch 90 connects the motor 54 directly across the power source 64. The motor is now energized to drive the driving spool until the sensor finger moves into a slot 58 in the film to cause the microswitch to connect the motor to the cathode 92 of the SCR 86.

Once the film is in place with the sensor finger 60 projecting into a slot 58, the cover 14 with the glass cone 16 secured thereto is placed over the support assembly 12 and is fastened securely thereto. The assembled device 10 is then slipped over a lens holder barrel of a laser system so that the barrel projects into the cylindrical bore 26 until the lens 96 is positioned behind the film 46.

A light flash from the laser source 94 is transmitted to the photodiode detector 74 by the light transmitting unit 98 and causes the detector to pass a gating signal from the power source 64 to the gate electrode 84 of the SCR 86. This gating signal causes the SCR to conduct, thereby energizing the motor 54 through the SCR.

When the motor 54 is energized by the SCR, the film moves onto the driving spool 50, and the inclined surface 62 of the sensing finger 60 cams the sensing finger inwardly to cause the microswitch 90 to connect the motor across the power source 64. The motor will now continue to drive the film until the sensing finger moves into a subsequent slot 58.

The glass or transparent plastic cone 16 encloses both the focused laser beam and a target surface placed at the small end of the cone frustum. Both the cone and the film 46 may be easily sterilized or replaced to adapt the laser system for medical applications.

We claim:

1. An automated lens protecting assembly for a light projecting system which includes a light source adapted to provide intermittent light pulses for projection to a target point and at least one lens for receiving light from said light source, comprising a movable lens protective means adapted to cover said lens and operative to pass light projected through said lens, said lens protective means having sensor operating means provided thereon, mounting means to mount said lens protective means over said lens between sad target point and lens, said mounting means supporting said lens protective means for movement relative to said lens, normally inactive drive means connected to said mounting means to drive said lens protective means relative to said lens, and drive control means connected to activate said drive means and operating in response to the emission of light from said light source to cause said drive means to move said lens protective means relative to said lens, said drive control means including light responsive switching circuit means operative to activate said drive means during receipt thereby of a light pulse from said light source and sensing means to sense said sensor operating means on said lens protective means, said sensing means operating to terminate activation of said drive means upon the sensing thereby of a sensor operating means, said drive control means includes a power source, said light responsive switching circuit means being operative to connect said drive means across said power source during receipt thereby of a light pulse from said light source and said sensing means including a sensor mounted upon said mounting means and operative by said sensor operating means and switch means linked for operation by said sensor to selectively connect said drive means either directly across said power source or to said light responsive switching circuit means for activation thereby.

2. The automated lens protecting assembly of claim 1 wherein said lens protective means is formed by an elongated film strip, said sensor operating means being longitudinally spaced along said film strip to activate said sensor to cause said switch means linked thereto to connect the driving means to said light responsive switching circuit means.

3. An automated lens protecting assembly for a laser system which includes a laser source adapted to provide intermittent light bursts for projection to a target point and at least one lens for receiving light from said laser source, comprising, an elongated protective film strip formed of material adapted to pass said laser light, said film strip being formed to a width sufficient to cover said lens, mounting means adapted to mount said film strip for movement over said lens between said target point and lens, said mounting means including a rotatable drive spool for said film strip positioned on one side of said lens, a rotatable supply spool for said film strip positioned on the side of said lens opposite said drive spool and guide means for guiding said film strip across said lens including a film guide plate positioned between said drive and supply spools, vacuum supply means mounted on said mounting means, a normally inactive drive motor mounted on said mounting means and connected to drive said drive spool, drive control means connected to activate said drive motor, said drive control means operating in response to a light burst from said laser source to cause the drive motor to drive the drive spool to move the film strip relative to said lens, a cover having an aperture extending through one wall thereof secured to said mounting means over said film guide means, and an open ended cone secured to said cover to enclose the laser light beam directed from said lens, said cone including a large end encircling the aperture in said cover and a small end adapted to enclose said target point, the small end of said cone including a plurality of air passageways extending therethrough, said cover including air passage means communicating with the interior of said cone adjacent the large end thereof, the air passage means being connected to said vacuum supply means.

4. The automated lens protecting assembly of claim 3 wherein said mounting means includes a baseplate having an aperture extending therethrough, said film guide plate being mounted in parallel spaced relation to said baseplate and having an aperture extending therethrough, and a central body section joining said base and film guide plates, said central body section having a cylindrical bore extending therethrough and aligned with the apertures in said base and film guide plates to provide a mounting bore to receive a lens barrel for said lens.

5. The automated lens protecting assembly of claim 4 wherein said guide means for guiding said film strip across the lens includes spaced guide shoulders extending longitudinally along opposite sides of said guide plate to define a recessed, film receiving guide surface therebetween, the aperture in said film guide plate being formed in the recessed guide surface between said guide shoulders, and an idler roller extending across said guide surface at either end of said guide plate, said idler rollers being mounted for free rotation and aligned to form a film path from said supply spool across said guide surface to said drive spool.

6. The automated lens protecting assembly of claim 3 wherein said drive control means operates to activate said drive motor until a section of film strip covering said lens is replaced by a successive film strip section from said supply spool, said drive control means including a power source, light responsive switching circuit means operative to connect said drive motor across said power source during receipt thereby of a light burst from said laser source and to disconnect said motor from said power source upon termination of the light burst, mechanical sensing means mounted for reciprocating movement upon said mounting means for contact with said film strip, and a switch means linked for operation by said mechanical sensing means to connect said motor either directly across said power source or to said light responsive switching circuit for activation thereby, said film strip including longitudinally spaced slots to receive said sensing means, said sensing means causing said switch means to connect the drive motor to said light responsive switching circuit means when received in a film slot and to otherwise cause said switching means to connect the motor directly across said power source.

7. The automated lens protecting assembly of claim 6 wherein said light responsive switching circuit includes a silicon controlled rectifier connected between said drive motor and power source, photoresponsive means connected to provide a gate signal from said power source to said silicon controlled rectifier upon receipt thereby of a light flash, and an optical light transmitting unit mounted upon said mounting means to receive and transmit a light burst from said laser source to said photoresponsive means.

8. The automated lens protecting assembly of claim 6 wherein said cover is formed to enclose said film guide plate and the space between said base and film guide plates, said cover being mounted on said mounting means to align the opening therein with the aperture in said film guide plate.